April 1, 1924.　　　　　　　　　　　　　　　　　1,488,802
F. R. BLANEY
AUTOMOBILE LOCK
Filed March 13, 1922
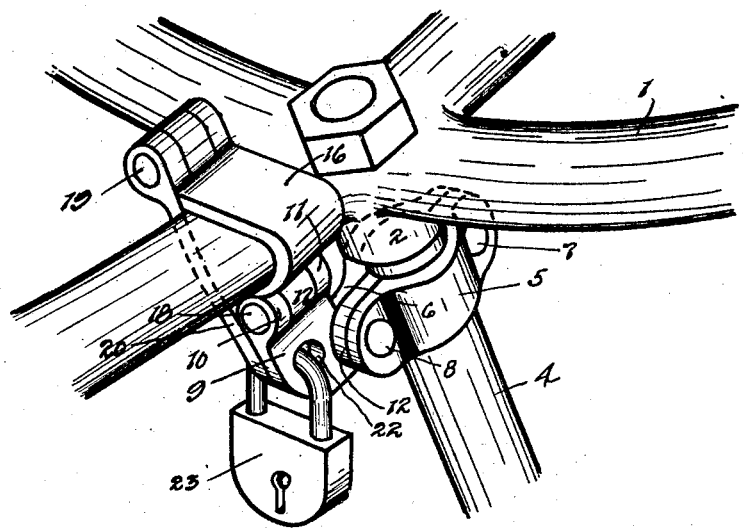
Fig. 1
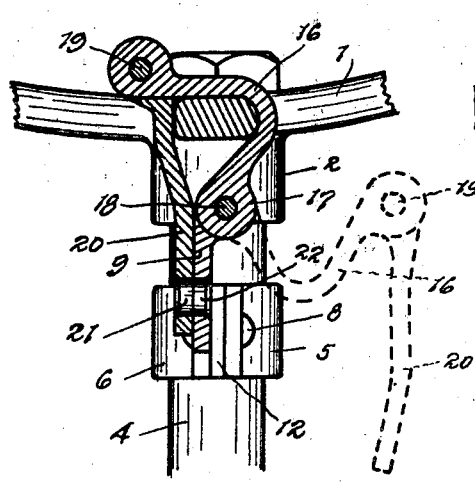
Fig. 2
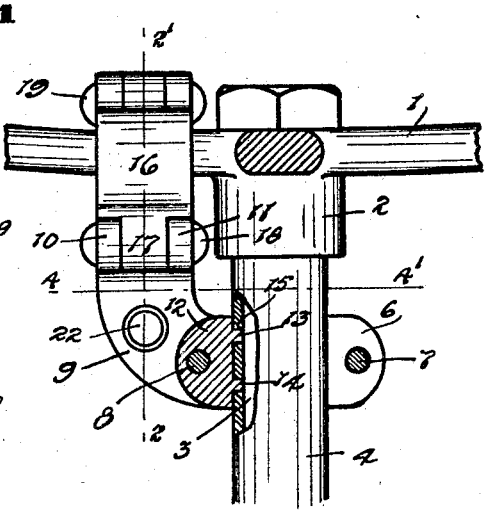
Fig. 3
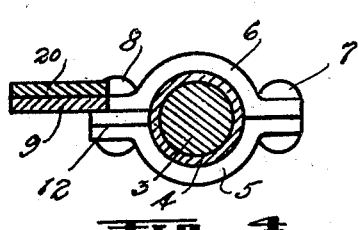
Fig. 4
Fig. 5
INVENTOR
F. R. Blaney
BY
ATTYS Patented Apr. 1, 1924.

1,488,802

UNITED STATES PATENT OFFICE.

FRANCIS R. BLANEY, OF WINNIPEG, MANITOBA, CANADA.

AUTOMOBILE LOCK.

Application filed March 13, 1922. Serial No. 543,423.

*To all whom it may concern:*

Be it known that I, FRANCIS R. BLANEY, of the city of Winnipeg, in the Province of Manitoba, Canada, have invented certain new and useful Improvements in Automobile Locks, of which the following is the specification.

The invention relates to improvements in automobile locks and particularly to a device for locking the steering wheel of an automobile against rotation and an object of the invention is to provide a simply constructed, inexpensive, durable and efficient lock which can be readily attached to the column and engaged with the wheel to positively lock the wheel against rotation.

A further object is to construct the appliance so that when it is unlocked it will in no way interfere with the normal manipulation of the steering wheel.

A further object is to construct a device which is positively anchored to the column so that it cannot be shifted and also a device arranged such that it will remain in a fixed position once locked and cannot be moved from that position even should the steering wheel arm be cut away.

With the above more important objects in view the invention consists essentially in the arrangement and construction of parts hereinafter more particularly described and later pointed out in the appended claims, reference being had to the accompanying drawing in which:

Fig. 1 is a perspective view of the appliance as it appears in use and when locked.

Fig. 2 is a vertical sectional view at 2—2' Fig. 3.

Fig. 3 is a side view of the appliance with certain parts broken away to expose construction.

Fig. 4 is a horizontal sectional view at 4—4' Fig. 3.

Fig. 5 is a perspective view of the plate carrying the studs.

In the drawing like characters of reference indicate corresponding parts in the several figures.

The steering wheel is of the usual form presenting the radiating arms 1 which extend from the hub 2. The wheel is attached in the ordinary manner to the steering post 3 which operates within the column 4, the column in the present disclosure being considered as a stationary member.

The device which I have provided is permanently mounted on the column and is provided with a jointed strap which passes around one of the steering wheel arms and is locked around the arm to prevent rotation of the wheel.

The appliance is now described in detail:

A pair of clamping jaws 5 and 6 are provided which are designed to pass around the column and are fastened in place by rivets 7 and 8 so that the said jaws cannot be removed without destroying the rivets.

One of the jaws, that 6, is supplied with an upturned extension or arm 9 which terminates in a pair of opposing spaced ears or eyes 10 and 11. Between the jaws at the side next the extension I have inserted a plate 12 which is held in place by the rivet 8 and which is provided on the inner side with a pair of studs 13 and 14 adapted to enter receiving openings 15 provided in the column. Obviously these studs will positively prevent any movement of the jaws on the column, once the rivets 7 and 8 are tightened up.

It will be here observed that the upper end of the arm 9 terminates somewhat below the plane of the steering arms 1.

To the upper end of the arm I pivotally connect a substantially U-shaped bar 16, the bar being fitted with a sleeve 17 entered between the ears 10 and 11 and pivotally connected thereto by a riveted pin 18. This bar 16 in the locked position of the device is adapted to pass upwardly to and horizontally across the steering arm 1 as best shown in Fig. 2.

The upper end of the bar 16 is pivotally connected by a riveted pin 19 to a locking bar or hasp 20 which in the locked position of the appliance passes downwardly at the side of the steering arm and has its lower end bearing against the face of the extension or arm 9.

The extension and hasp are provided with mating openings 21 and 22 adapted to receive a padlock indicated generally by the reference numeral 23.

When the device is in use it is locked by the padlock and obviously when once locked any rotary movement of the steering wheel is positively prevented.

When one removes the padlock he swings the hasp 20 upwardly and then swings the bar 16 downwardly, the moving parts then taking a position as best shown in dotted outline in Figure 2, where it will be observed they are entirely clear of the arms 1 of the steering wheel.

Whilst I have shown the padlock as utilized for locking the device I wish it to be understood I do not desire to be limited to the type of padlock shown as any type of lock which would fasten the lower end of the hasp to the arm 9 would serve my purpose.

I wish to point out that it is very desirable to permanently fasten the jaws 5 and 6 to the steering column. If this be not done it will be quite possible for a thief to cut the locked arm of the steering wheel with a saw at opposite sides of the appliance and then knock the clamping jaws downwardly on the column to pass the device completely out of the road of the remaining arms of the steering wheel.

However, by positively fastening the jaws to the column a thief might cut the locked arm 1, as above intimated, but he could not properly steer the automobile as the appliance would still remain as a permanent fixture which would interfere with the turning of the steering wheel by engagement with the remaining arms thereof.

In this connection it is pointed out, also, that once the padlock is locked the device remains as a rigid structure, even although the arm in question might be cut.

I point these features out as I am aware that there are other somewhat similar devices, but they have the disadvantage that they can be moved in respect to the column and also moved in the event that the arm to which they are attached is cut.

What I claim as my invention is:

The combination with a steering column and steering wheel arm, of a lock for locking the steering wheel against rotation, comprising a pair of jaws receiving the column and permanently riveted together, one of said jaws being provided at one end with an upturned extension, a plate interposed between the jaws and permanently fastened thereto, said plate being provided with studs extending into complementary openings provided in the column, a jointed strap pivotally secured to the extension and passing around the arm of the wheel and a padlock or such like releasably fastening the free end of the strap to the extension.

Signed at Winnipeg, this 22nd day of February, 1922.

FRANCIS R. BLANEY.

In the presence of—
GERALD S. ROXBURGH,
M. B. KELLEHER.